United States Patent
Yang et al.

(10) Patent No.: US 10,841,855 B2
(45) Date of Patent: Nov. 17, 2020

(54) WIRELESS COMMUNICATION METHOD AND TERMINAL FOR RAIL TRANSIT

(71) Applicant: GUANGDONG NUFRONT COMPUTER SYSTEM CHIP CO., LTD, Guangzhou (CN)

(72) Inventors: Zhizuo Yang, Beijing (CN); Shenfa Liu, Beijing (CN); Desheng Yan, Beijing (CN); Dongshan Bao, Beijing (CN)

(73) Assignee: GUANGDONG NUFRONT COMPUTER SYSTEM CHIP CO., LTD., Guangzhou (CN)

( * ) Notice: Subject to any disclaimer, the term of this patent is extended or adjusted under 35 U.S.C. 154(b) by 0 days.

(21) Appl. No.: 16/348,691

(22) PCT Filed: Dec. 7, 2016

(86) PCT No.: PCT/CN2016/108815
§ 371 (c)(1),
(2) Date: May 9, 2019

(87) PCT Pub. No.: WO2018/094771
PCT Pub. Date: May 31, 2018

(65) Prior Publication Data
US 2019/0289522 A1    Sep. 19, 2019

(30) Foreign Application Priority Data
Nov. 23, 2016    (CN) .......................... 2016 1 1035650

(51) Int. Cl.
*G08B 5/38*     (2006.01)
*H04W 36/32*    (2009.01)
(Continued)

(52) U.S. Cl.
CPC ......... *H04W 36/32* (2013.01); *B61L 15/0027* (2013.01); *H04W 24/10* (2013.01);
(Continued)

(58) Field of Classification Search
CPC .............. G05B 13/028; G05B 19/4183; G05B 19/4184; G05B 19/41845; G05B 19/4185;
(Continued)

(56) References Cited

U.S. PATENT DOCUMENTS 6,934,546 B1 *   8/2005   Corbett ................. H04L 12/437
                                                         455/441
6,952,181 B2 *  10/2005   Karr ..................... G01C 21/206
                                                         342/457

(Continued)

FOREIGN PATENT DOCUMENTS

CN        1859784 A       11/2006
CN     2016108815 A1      12/2010
(Continued)

OTHER PUBLICATIONS

The World Intellectual Property Organization (WIPO) International Search Report for PCT/CN2016/108815 dated Jul. 6, 2017 5 Pages (including translation).

*Primary Examiner* — Daniel Previl
(74) *Attorney, Agent, or Firm* — Anova Law Group, PLLC (57) ABSTRACT

The present invention provides a wireless communication method for rail transit. The method comprises: performing signaling interaction with a source cell base station after entering a source cell and obtaining a handover threshold parameter, the handover threshold parameter comprising distance information between a handover point and the source cell base station and signal intensity information; determining the handoff point based on the handover thresh- (Continued)

old parameter; and performing channel measurement when the handover point is reached and performing a handover from the source cell to a destination cell.

12 Claims, 3 Drawing Sheets (51) Int. Cl.
*B61L 15/00* (2006.01)
*H04W 24/10* (2009.01)
*H04W 36/00* (2009.01)
*H04W 36/08* (2009.01)
*H04W 36/30* (2009.01)

(52) U.S. Cl.
CPC ... *H04W 36/0061* (2013.01); *H04W 36/0088* (2013.01); *H04W 36/08* (2013.01); *H04W 36/30* (2013.01)

(58) Field of Classification Search
CPC ........ G05B 19/41865; G05B 19/41875; G05B 2219/32287; G05B 2219/35001; G05B 2219/37337; G05B 2219/37351; G05B 2219/37434; G05B 2219/40115; G05B 2219/45004; G05B 2219/45129; G05B 23/0221; G05B 23/0229; G05B 23/024; G05B 23/0264; G05B 23/0283; G05B 23/0286; G05B 23/0289; G05B 23/0291; G05B 23/0294; G05B 23/0297; G05B 19/0425; G05B 2219/25428; G05B 2219/33331; G06K 9/6263; G06K 9/62; G06K 9/6262; G06N 20/00; G06N 3/02; G06N 5/046; G06N 7/005; G06N 3/006; G06N 3/0445; G06N 3/0454; G06N 3/0472; G06N 3/084; G06N 3/088; G06N 3/126; G06N 20/10; G06N 20/20; G06N 3/0427; G06N 3/0436; G06N 3/049; G06N 3/086; G06N 5/003; H04B 17/309; H04B 17/318; H04L 1/0002; H04L 1/0041; H04L 5/0064; H04L 67/1097; H04L 67/12; H04L 1/18; H04L 67/04; H04L 67/10; Y02P 80/114; Y02P 90/02; B61L 15/0027; H04W 24/10; H04W 36/0061; H04W 36/00837; H04W 36/0085; H04W 36/0088; H04W 36/08; H04W 36/30; H04W 36/32
USPC ............. 340/331, 520, 534, 539.21, 539.22, 340/538.15, 576, 641, 661, 691.7, 3.43, 340/825.29, 825.72
See application file for complete search history.

(56) References Cited

U.S. PATENT DOCUMENTS

| | | | |
|---|---|---|---|
| 9,723,520 B1* | 8/2017 | Sylvain | H04W 36/14 |
| 2003/0053431 A1* | 3/2003 | Madour | H04W 36/38 |
| | | | 370/331 |
| 2007/0287473 A1* | 12/2007 | Dupray | H04W 4/029 |
| | | | 455/456.1 |
| 2008/0096560 A1* | 4/2008 | Felske | H04W 36/00837 |
| | | | 455/436 |
| 2009/0086672 A1* | 4/2009 | Gholmieh | H04W 48/14 |
| | | | 370/329 |
| 2013/0115951 A1* | 5/2013 | Deng | H04W 36/24 |
| | | | 455/436 |

FOREIGN PATENT DOCUMENTS

| | | |
|---|---|---|
| CN | 102761923 A | 10/2012 |
| CN | 103796256 A | 5/2014 |
| CN | 104168614 A | 11/2014 |

* cited by examiner

WIRELESS COMMUNICATION METHOD AND TERMINAL FOR RAIL TRANSIT

This PCT patent application is a national phase entry under 35 U.S.C. § 371 of International Application No. PCT/CN2016/108815, filed on Dec. 7, 2016, which claims priority of Chinese Patent Application No. 201611035650.5, filed on Nov. 23, 2016 The above enumerated patent applications are incorporated by reference herein in their entirety.

FIELD OF THE INVENTION

The invention belongs to the communications field more particularly to a wireless communications methods and terminal for traffic train.

BACKGROUND ART OF THE INVENTION

It is well known that city rail transit system has become one of main traffic mode of people's daily trip. With the rapid development of information and communication technology to broadband, the demand of rail traffic informatization is also constantly promoted. With the rapid development of mobile communication service, people also wish to enjoy two-way, stable, reliable, high speed mobile communication service during taking urban track traffic, this made higher requirement bandwidth, the stability of city rail transit system communication system.

Bandwidth data communication systems towards city rail transit system at least need to solve the problems, such as following:

The first, car body decaying is to attenuation problem of signal strength and directional problems of antenna; When wireless communication terminal installed on subway, due to the limitation of compartment height, for single terminal, its antenna which can communications with multiple different directions base station cannot be installed in roof, If two directional antenna towards the heading and the opposite direction is installed respectively in the head and tail of train to communicate with the base station, this will result in different cell coverage ranges of terminals with different characteristics corresponding to a single base station.

Under the influence of vehicle attenuation and antenna directivity, the attenuation of signals received by terminals in two directions in the wireless environment is obviously different.

The second, signal measurement problem when base station before and after the switching, at present is generally to all users with the method of unified district division, by multiple measurements to contrast the source of the residential area and target the signal strength and signal quality determine whether trigger handover, amounts of measurement, distance measurement cost is higher, affect the overall efficiency of wireless communication system.

SUMMARY OF THE INVENTION

In view of this, technical problem to be solved by the invention is to provide a wireless communications methods and terminal for traffic train. In order to which some aspects of the embodiment to disclosure have a basic understanding, simple summary is shown below. The summarized section is not extensive overview, nor to determine key/critical component or describe the protection scope of these embodiments. Its sole purpose is that some concepts are presented with simple form, in this, as the preamble of following detailed description.

In some alternative embodiments, it provides a wireless communication method of for traffic train, comprising:

Carrying out signaling exchange with source cell base station after entering source cell and obtaining handoff threshold parameter; said handoff threshold parameter including signal strength information and distance information between switching point and said source cell base station;

Determining switching point based on said handoff threshold parameter;

Making a measurement on channel when reaching said switching point, and switching to purpose cell from said source cell.

In some embodiments, said carrying out signaling exchange and obtaining handoff threshold parameter, specifically including:

Sending request for parameter acquisition to said source cell base station, said request for parameter acquisition carries type information and direction of travel information of vehicle terminal;

Receiving response of parameter acquisition sent by said source cell base station, said parameter obtains response carries the handoff threshold parameter.

In some embodiments, said type information of car-mounted terminal including headstock terminal or tailstock terminal.

In some embodiments, said determining switching point based on said handoff threshold parameter specifically including:

Navigating to next switching point based on distance information and signal strength information of switching point and the source cell base station.

In some embodiments, the position is as switching point when it meets following two condition simultaneously:

Distance between said terminal and the source cell base station is more than the distance threshold between the switching point and the source cell base station in said handoff threshold parameter;

Signal strength is lower than the signal strength threshold in handoff threshold parameter.

In some embodiments, at least two switching points set between the purpose cell base station and the source cell base station, the position of each switching point set at location where the terminal receives signals from two neighbor base station, intensity of the two signals is closest; Each base station maintenance four switching points.

In some embodiments, said making a measurement on channel when reaching said switching point, and switching to purpose cell from said source cell, specifically including:

Sending channel measurement request the source cell base station when reaching switching point;

Receiving channel measurement response from said source cell base station is sent;

Sending channel measurement report to said source cell base station;

Sending switching request to said source cell base station;

Receive switching command sent by source cell base station;

Switching from said source cell to the purpose cell is in switching point.

In some alternative embodiments, a terminal used for traffic train, comprising:

Signaling exchange unit, used for carrying out Signaling exchange with source cell base station after entering source cell and obtaining handoff threshold parameter, said handoff threshold parameter includes distance information and signal strength information of switching point and the source cell base station;

Judging unit, used for determining switching point based on said handoff threshold parameter;

Measuring unit, used for carrying out channel measurement when reaching switching point; and, Switch unit, used for switching to purpose cell from said source cell.

In some embodiments, said Signaling exchange unit including:

Parameter acquisition request module, used for ending request for parameter acquisition to said source cell base station, said request for parameter acquisition carries type information and direction of travel information of vehicle terminal;

Obtain module, receiving response of parameter acquisition sent by said source cell base station, said parameter obtains response carries the handoff threshold parameter.

In some embodiments, said type information of terminal including:

headstock terminal or tailstock terminal.

In some embodiments, said Judging unit used for navigating to next switching point based on distance information and signal strength information of switching point and the source cell base station.

In some embodiments, the position is as switching point when it meets following two condition simultaneously:

Distance between said terminal and the source cell base station is more than the distance threshold between the switching point and the source cell base station in said handoff threshold parameter;

Signal strength is lower than the signal strength threshold in handoff threshold parameter.

In some embodiments, at least two switching points set between the purpose cell base station and the source cell base station, the position of each switching point set at location where the terminal receives signals from two neighbor base station, intensity of the two signals is closest; Each base station maintenance four switching points.

In some embodiments, said measuring unit comprising:

First sending module, used for sending channel measurement request the source cell base station when reaching switching point;

First receiving module, used for receiving channel measurement response from said source cell base station is sent;

Second sending module, used for sending channel measurement report to said source cell base station;

In some embodiments, said switch unit comprising:

Third sending module, used for sending switching request to said source cell base station;

Second receiving module, used for receiving switching command sent by source cell base station;

Switching module, used for switching from said source cell to the purpose cell is in switching point.

The present disclosure is different from traditional way that cell allocation in a uniform manner for all users, different cell boarders is provided according to the characteristics of different terminals user, and fully consider car body decaying to decreasing of signal strength and directionality of antenna, in conjunction with the characteristics of rail traffic, design cell allocation solution for different terminals user feature, switching point can be accurately provided in the signal strength of different directions in conjunction with different terminals user, so that terminal user only needs one-shot measurement process to complete cell switching in most cases, greatly reduce number of measurements, reduce cost of cell switching, improve communication efficiency of total system.

For the above and related purposes, one or more embodiments including the feature for being particularly described below and being particularly pointed out in the claims. Certain illustrative aspect, and some modes in the only utilizable various modes of principle of each embodiment of its instruction are described in detail in the following description and the annexed drawings. Other benefits and novel features will be considered in conjunction with the accompanying with following detailed description and become obvious, and the disclosed embodiments are all such aspects to be included and they are equal.

DETAILED DESCRIPTION OF THE INVENTION

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part of and a certain feature of some embodiments may be included in or replaced by a part of and a certain feature of other embodiment. The scope of the embodiment of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended certainly to limit the application scope to any individual invention or inventive concept.

First Embodiment

Figure 1:
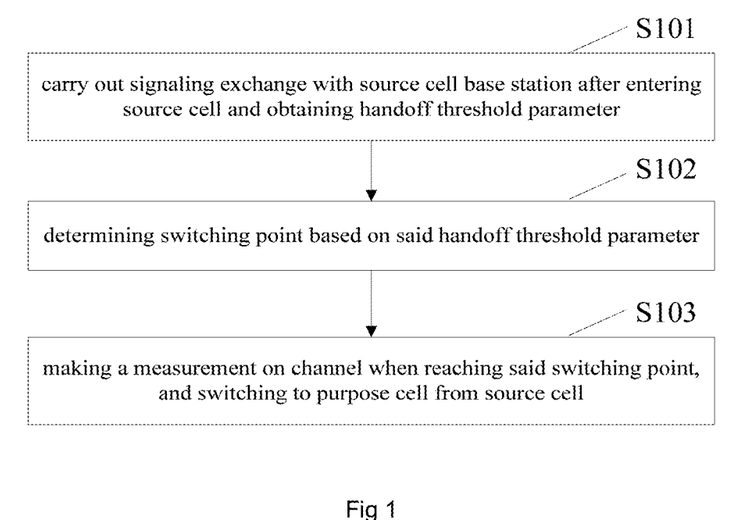
FIG. 1 is a method flow schematic diagram for wireless communication for traffic train that first embodiment of the present disclosure provides.

As shown in FIG. 1, a wireless communication method for traffic train provided in first embodiment of the present disclosure, comprising following steps:

Step S101, car-mounted terminal carry out signaling exchange with source cell base station after entering source cell and obtaining handoff threshold parameter; said handoff threshold parameter including signal strength information and distance information between switching point and said source cell base station;

Step S102, determining switching point based on said handoff threshold parameter;

Step S103, car-mounted terminal making a measurement on channel when reaching said switching point, and switching to purpose cell from source cell.

In some embodiments, type of car-mounted terminal including headstock terminal or tailstock terminal.

Second Embodiment

Figure 2:
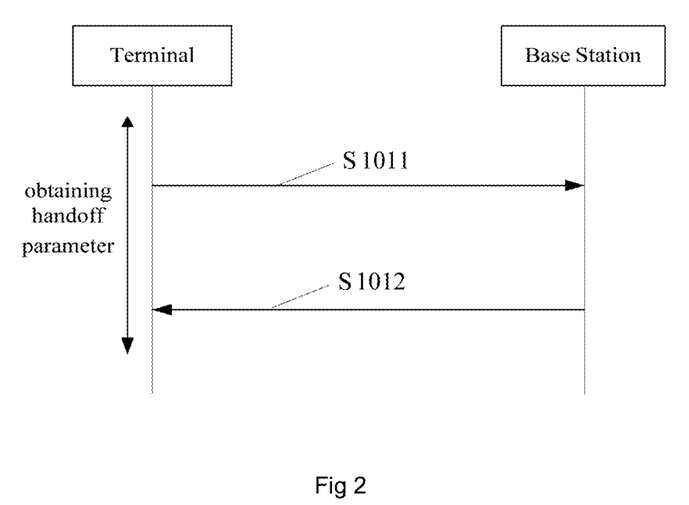
FIG. 2 is a signaling exchange method flow schematic diagram for getting parameters provided by second embodiment of the present disclosure

A wireless communication method for traffic train provided in first embodiment of the present disclosure, comprising following steps:

Step S101, car-mounted terminal carry out signaling exchange with source cell base station after entering source cell and obtaining handoff threshold parameter; said handoff threshold parameter including signal strength information and distance information between switching point and said source cell base station;

Wherein, FIG. 2 shows a schematic diagram of Signaling exchange method for getting parameters, as shown in FIG. 2, In some embodiments, step S101 specifically includes the following steps:

Step S1011, the terminal send request for parameter acquisition to said source cell base station, said request for parameter acquisition carries type information and direction of travel information of vehicle terminal;

In some embodiments, type of car-mounted terminal including headstock terminal or tailstock terminal.

Step S1012, source cell base station send parameter acquisition response to the terminal, said parameter obtains response carries the handoff threshold parameter.

Step S102, determining switching point based on said handoff threshold parameter;

In some embodiments, navigating to next switching point based on distance information and signal strength information of switching point and the source cell base station, this switching point is the switching point switched from current area to purpose cell.

In some embodiments, the selection method of switching point: the signal strength of wireless channel decreases monotonically with the increase of the distance apart from base station. In order to guarantee of the signal quality of wireless channel and then raising efficiency of integrated communication system, choose the position where terminal receives two immediate signals intensity from neighbor base station as switching point. And the signal strength that terminal is collected is closely related with the decaying of channel in the case when base station transmits close power. In the scene of rail traffic, the decaying of channel not only with distance dependent, is also closely related with the direction of antenna and terminal, and the positional relationship of train body. Therefore, the selection of the position of switching point is closely related to terminal type.

In some embodiments, due to two kinds of situations of headstock terminal or tailstock terminal, at least two switching points set between the purpose cell base station and the source cell base station, the position of each switching point set at location where the terminal receive signals from two neighbor base station, intensity of the two signals is closest; Each base station maintenance four switching points.

In some embodiments, the method for determining switching point: in wireless channel environment, the result of ranging and signal strength is influenced by multipath effect, the factors such as channel noise, and there are certain errors in the value of ranging and signal strength. In order to more accurately determine the position of switching point, using two indexes result of ranging and signal strength combined for raising locating accuracy in the present disclosure. The position is as switching point when it meets following two conditions simultaneously:

Distance between said terminal and the source cell base station is more than the distance between the switching point and the source cell base station in said handoff threshold parameter in S1012; Signal strength is lower than the signal strength in handoff threshold parameter in S1012, then triggering measurement and switching flow, i.e. step S103.

Step S103, making a measurement on channel when reaching said switching point, and switching to purpose cell from source cell.

It is more than switching point in S1012 in handoff threshold parameter and the range information of the source cell base station at a distance from source cell when meeting terminal simultaneously, position when signal strength is lower than two conditions of signal strength information in S1012 handoff threshold parameter is as switching point, then triggering measurement and switching flow, i.e. step S103.

Step S103, carries out channel measurement when reaching switching point, and switches to purpose cell from source cell.

Figure 3:
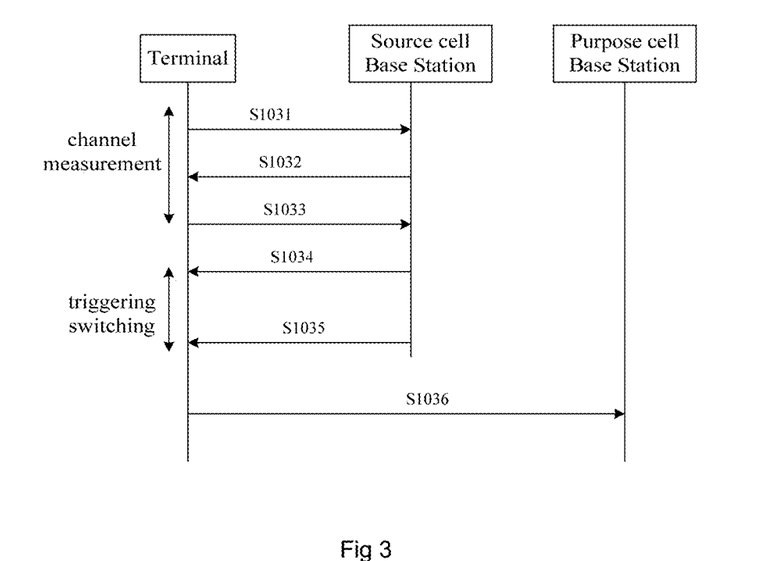
FIG. 3 is a method flow schematic diagram for measuring and switching provided by second embodiment of the present disclosure.

Wherein, FIG. 3 provides a schematic diagram for measuring and switching, as shown in FIG. 2, In some embodiments, step S103 specifically includes the following steps:

Step S1031, the terminal sending channel measurement request to the source cell base station when reaching switching point;

Step S1032, source cell base station sending channel measurement response to the terminal;

Step S1033, the terminal sending channel measurement report to source cell base station;

Step S1034, the terminal sending switching request to source cell base station;

Step S1035, source cell base station send switching command to the terminal;

Step S1036, the terminal switching from source cell to the purpose cell in switching point.

In some embodiments, there is a directional antenna towards two different directions in each base station. Since the antenna of headstock terminal is towards headstock direction, and signal decaying due to car body itself, cause headstock terminal pass by switching point, although switching point is closer apart from source cell base station, farther out apart from purpose cell base station, but the signal strength which headstock terminal receives from purpose cell base station and the signal strength from source cell base station is close at the switching point.

After passing the switching point, with the increase of distance, the signal that headstock terminal receives from purpose cell base station is more and more stronger, and although source cell base station is closer, but due to directionality of directional antenna and huge signal decaying caused by car body result in the signal sharp-decay which headstock terminal received from source cell base station. In view of factors above, the switching point of headstock terminal is configured. Unlike headstock terminal, for tailstock terminal, due to antenna direction, the sense of car body decaying is different. The signal strength that tailstock terminal receive from purpose cell base station and source cell base station just is close at another switching point, although the switching point is very close apart from purpose cell base station and farther away from source cell base station in distance. In short, different according to the type of terminal, the selection of switching point is completely different.

Heretofore described train includes track train, such as subway, high-speed rail etc., also comprising rail-free train, such as bus, automobile etc, all of them are within the protection scope of the present disclosure.

It is illustrated by taking two specific examples as an example below, wherein EBU refers to the base station in wireless communication, and EAU refers to the terminal communication device in wireless communication, and in particular refers to the communication equipment for being mounted on train both ends in the present disclosure. EBU-S refers to source cell base station, EBU-D refers to the purpose cell base station.

Third Embodiment

Figure 4:
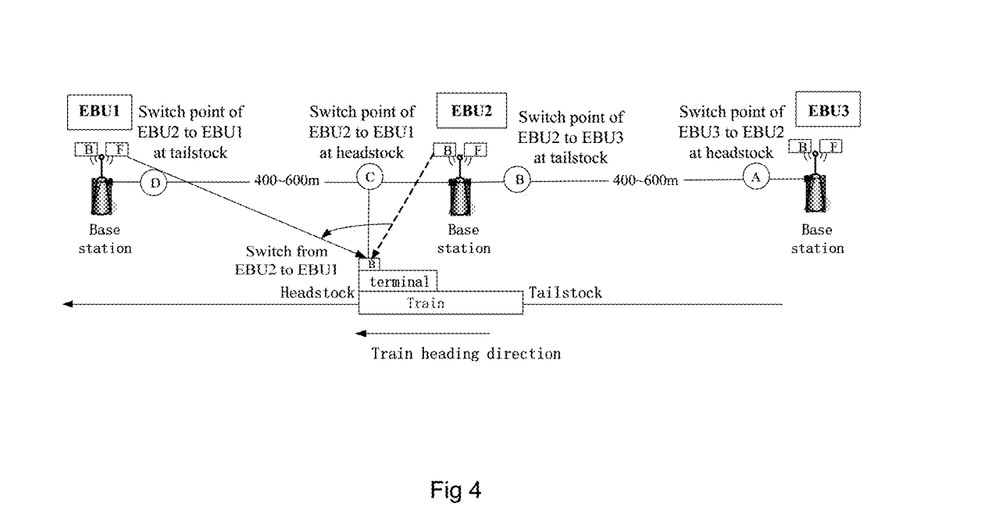
FIG. 4 is a schematic diagram of a headstock terminal provided in third embodiment of the present disclosure.

FIG. 4 illustrates schematically that the type of a terminal is headstock terminal in a specific embodiment, terminal is mounted on train head, as shown in FIG. 4, B and F respectively represents the directional aerial towards two different directions, there are three base station EBU1, EBU2 and EBU3, 4 switching points: A, B, C, D, terminal is arranged in the head of train, and point A and point C are the switching point of headstock terminal. Travel direction of the train is from EBU3 to EBU2 to EBU1.

Step S401, headstock terminal carry out signaling exchange with base station EUB2 and obtaining handoff threshold parameter after passing by point A and entering the cell where the base station EUB2 is in, as shown in FIG. 2, specifically includes the following steps:

Step S4011, the headstock terminal send request for parameter acquisition to the base station EUB2, type of the terminal carried by said request for parameter acquisition and direction of travel is from EBU2 to EBU1;

Step S4012, base station EUB2 send parameter acquisition response to the headstock terminal, said parameter obtains response carries the handoff threshold parameter. Said handoff threshold parameter including signal strength information and distance information between switching point and said source cell base station; headstock terminal navigating to next switching point C based on distance information and signal strength information of switching point and the source cell base station, this switching point C is the switching point where headstock terminal switched from EBU2 cell to EBU1 cell.

The position C is as switching point when it meets following two conditions simultaneously:

Distance between headstock terminal and the source cell base station is more than the distance threshold between the switching point and the source cell base station in said handoff threshold parameter;

Signal strength is lower than the signal strength threshold in handoff threshold parameter.

Step S403, carries out measurement and triggering switching flow when headstock terminal reaching switching point C, as shown in FIG. 2, specifically includes the following steps:

Step S4031, the headstock terminal sending channel measurement request to the base station EBU2;

Step S4032, the base station EBU2 sending channel measurement response to the headstock terminal, headstock terminal starts to measure signal strength of EBU2 cell after receiving response. Due to accurate positioning, the signal strength obtained under normal circumstances meets requirement of cell switching.

Step S4033, the headstock terminal sending channel measurement report to base station EBU2;

Step S4034, the headstock terminal sending switching request to base station EBU2;

Step S4035, base station EBU2 send switching command to the headstock terminal;

Step S4036, the headstock terminal switching from EBU2 to EBU1 after received the switching command.

In some embodiments, B and F respectively refer to two directional antennas towards two different directions. Since the antenna of headstock terminal is towards headstock direction, and signal decaying due to car body itself, cause headstock terminal pass by switching point C, although switching point C is closer apart from the base station EBU2, farther out apart from the base station EBU1, but the signal strength which headstock terminal receives from EBU1 and the signal strength from EBU2 is close at the switching point. After passing the switching point C, with the increase of distance, the signal that headstock terminal receives from the EBU1 is more and more strong, and although base station EBU2 is closer, but due to directionality of directional antenna and huge signal decaying caused by car body result in the signal sharp-decay which headstock terminal received from EBU2. In view of factors above, the switching point C of headstock terminal is configured.

Fourth Embodiment

Figure 5:
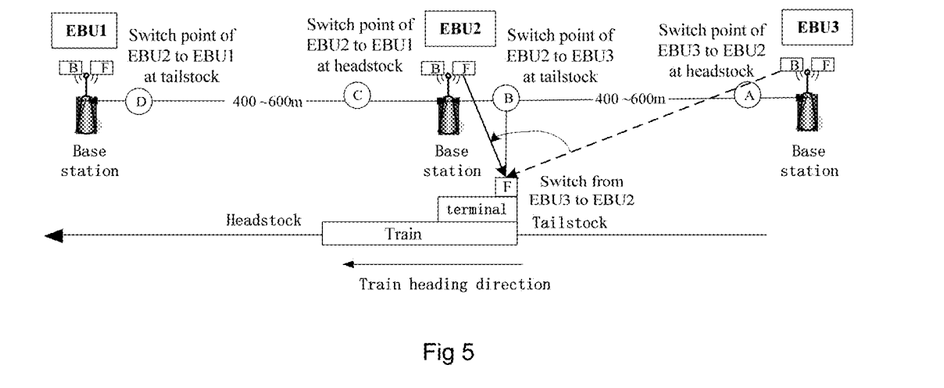
FIG. 5 is a schematic diagram of another headstock terminal provided in fourth embodiment of the present disclosure.

FIG. 5 illustrates schematically a tailstock terminal in a specific embodiment. as shown in FIGS. 5, B and F respectively represents the directional aerial towards two different directions, there are three base station EBU1, EBU2 and EBU3, four switching points: A, B, C, D, terminal is arranged in the rail of train, and point B and point D are the switching point of tailstock terminal travel direction of the train is from EBU3 to EBU2 to EBU1.

Step S501, tailstock terminal carry out signaling exchange with the base station EUB3 and obtaining handoff threshold parameter after passing by point A and entering the cell where the base station EUB3 is in, as shown in FIG. 2, specifically includes the following steps:

Step S5011, the tailstock terminal send request for parameter acquisition to the base station EUB3, type of the terminal carried by said request for parameter acquisition and direction of travel is from EBU3 to EBU2;

Step S5012, base station EUB3 send parameter acquisition response to the tailstock terminal, said parameter obtains response carries the said parameters. Said parameters including signal strength information and distance information of the base station;

The tailstock terminal navigating to next switching point B based on distance information away from base station EBU3 and collected signal strength information, this switching point B is the switching point where tailstock terminal switched from EBU3 cell to EBU2 cell.

The position B is as switching point when it meets following two conditions simultaneously:

Distance between tailstock terminal and the source cell base station is more than the distance threshold between the switching point and the source cell base station in said handoff threshold parameter;

Signal strength is lower than the signal strength threshold in handoff threshold parameter.

Step S503, carries out measurement and triggering switching flow when tailstock terminal reaching switching point B, as shown in FIG. 3, specifically includes the following steps:

Step S5031, the tailstock terminal sending channel measurement request to the base station EBU3;

Step S5032, the base station EBU3 sending channel measurement response to the tailstock terminal, tailstock terminal starts to measure signal strength of EBU3 cell after receiving response. Due to accurate positioning, the signal strength obtained under normal circumstances meets requirement of cell switching.

Step S5033, the tailstock terminal sending channel measurement report to base station EBU3;

Step S5034, the tailstock terminal sending switching request to base station EBU3;

Step S5035, base station EBU3 send switching command to the tailstock terminal;

Step S5036, the tailstock terminal switching from EBU3 to EBU2 after received the switching command.

In some embodiments, B and F respectively refer to two directional antennas towards two different directions. Since the antenna of tailstock terminal is towards tailstock direction, and signal decaying due to car body itself, cause tailstock terminal pass by switching point B, although switching point B is closer apart from the base station EBU2, farther apart from the base station EBU3, but the signal strength which tailstock terminal receives from EBU3 and the signal strength from EBU2 is close at the switching point. After passing the switching point B, with the increase of distance, the signal that tailstock terminal receives from the EBU3 is more and more strong, but EBU3 due to directionality of directional antenna and huge signal decaying caused by car body result in the signal sharp-decay which tailstock terminal received from EBU3.

It is learnt from the third and fourth embodiment, according to different type of terminal, the selection of switching point is completely different.

Fifth Embodiment

Figure 6:
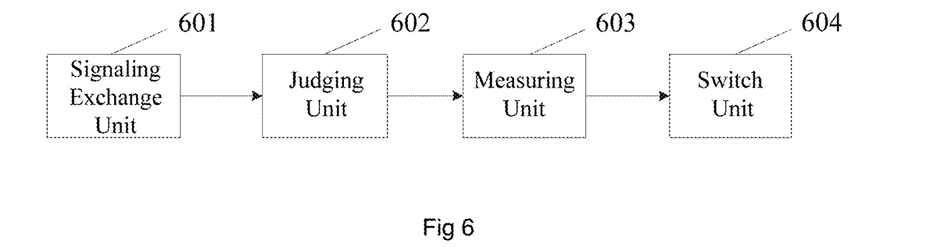
FIG. 6 is a structural schematic diagram of a wireless communication terminal for traffic train that provided in fifth embodiment of the present disclosure.

FIG. 6 is a structural schematic diagram of a wireless communication terminal for traffic train. As shown in FIG. 6, the terminal comprising:

Signaling exchange unit 601, used for carrying out signaling exchange with source cell base station after entering source cell and obtaining parameters, said parameters include distance information away from said source cell base station and signal strength information;

Judging unit 602, used for determining switching point based on said parameters;

Measuring unit 603, used for carrying out channel measurement; and,

Switch unit 604, used for switching to purpose cell.

Figure 7:
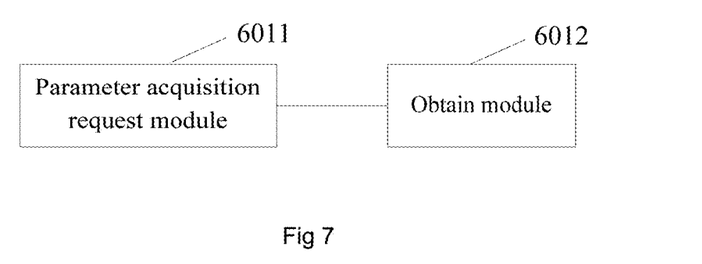
FIG. 7 is a structural schematic diagram for the signaling exchange unit in terminal that provided in fifth embodiment of the present disclosure.

In some alternative embodiments, as shown in FIG. 7, specifically signaling exchange unit 601 comprising:

Parameter acquisition request module 6011, used for sending request for parameter acquisition to said base station, said request for parameter acquisition carries type information and direction of travel information of vehicle terminal;

Obtain module 6012, receiving response of parameter acquisition sent by said base station, said parameter obtains response carries said parameters.

In some alternative embodiments, said type information of terminal including: headstock terminal or tailstock terminal.

In some alternative embodiments, said Judging unit 602 navigating to next switching point based on said parameters.

Figure 8:
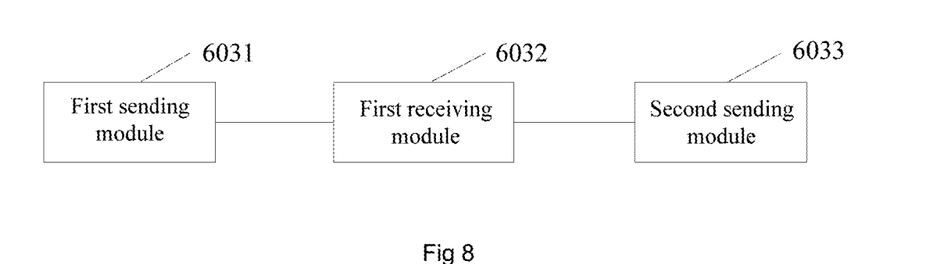
FIG. 8 is a structural schematic diagram for the measuring unit in terminal that provided in fifth embodiment of the present disclosure.

In some alternative embodiments, as shown in FIG. 8, specifically, said measuring unit 603 comprising:

First sending module 6031, used for sending channel measurement request to the source cell base station;

First receiving module 6032, used for receiving channel measurement response sent by said source cell base station;

Second sending module 6033, used for sending channel measurement report to said source cell base station;

In some alternative embodiments, as shown in FIG. 9, specifically, said switching unit 604 comprising:

Third sending module 6041, used for sending switching request to said source cell base station;

Second receiving module 6042, used for receiving switching command sent by source cell base station;

Switching module 6043, used for switching from said source cell to purpose cell in switching point.

The present disclosure is different from traditional way that cell allocation in a uniform manner for all users, different cell boarders is provided according to the characteristics of different terminals user, and fully consider car body decaying to decreasing of signal strength and directionality of antenna, in conjunction with the characteristics of rail traffic, design cell allocation solution for different terminals user feature, switching point can be accurately provided in the signal strength of different directions in conjunction with different terminals user, so that terminal user only needs one-shot measurement process to complete cell switching in most cases, greatly reduce number of measurements, reduce cost of cell switching, improve communication efficiency of total system.

It will be understood by those skilled in the art that the various illustrative method and steps and device unit here in conjunction with the disclosed embodiments description can be realized with the combination of electronic hardware, software or both. In order to be clearly shown the interchangeability between hardware and software, the above description carried out in the form of its functionality to various illustrative steps and unit generally. This functionality is with hardware realization or the design constraint implemented in software realized dependent on specific application and whole system. Those skilled in the art can realize described function in many ways, but the result of this realization should not be construed as away from the scope of the present disclosure for each specific application.

Using general processor, Digital Signal Processor (DSP), Application Specific Integrated Circuit (ASIC), field programmable gate array (FPGA) either other programmable logical devices, discrete gate or transistor logic, discrete hardware components or any combination among them, the various illustrative units in conjunction with embodiment disclosed herein description are may be implemented or executed. General processor may be microprocessor, but in another case, which may be any conventional processor, controller, microcontroller or state machine. Processor may also be implemented as calculating the combination of equipment, for example, the combination of DSP and microprocessor, multi-microprocessor, the microprocessor of one or more combination DSP cores or any other such structure.

The step of method in conjunction with described in embodiment disclosed above can be embodied directly in hardware, Software module be executed by processor, or combinations of both. Software module is likely to be present in the storage media of RAM memory, flash memory, ROM memory, EPROM memory, EEPROM memory, register, hard disk, Mobile hard disk, CD-ROM or any other form well known in the art. A kind of exemplary storage medium is coupled with processor, so that processor can read information from the storage media, and can be to the storage media write information. In replacement example, storage media is the component part of processor. Processor and storage media are likely to be present in an ASIC. The ASIC is likely to be present in a subscriber station. In a replacement example, processor and storage media can be used as the presence of the discrete assembly in subscriber station.

The present disclosure can be implemented or used by those skilled in the art in light of the embodiments disclosed. Various modifications to these embodiments are obvious to those skilled in the art, and the general principles defined herein may be applied to other embodiments without departing from the scope and spirit of the invention. The above-mentioned embodiments are merely preferred embodiments of the present disclosure, and are not intended to limit the present disclosure. Any modifications, equivalents, improvements, etc., which are included in the spirit and principles of the present disclosure, should be included in the scope of protection of the present disclosure.

What is claimed is:

1. A wireless communication method of for a wireless terminal configured on a vehicle, comprising:
   sending, by the wireless terminal, a request for parameter acquisition to a source cell base station associated with a source cell, the request including whether the wireless terminal is a headstock terminal configured at a head portion of the vehicle or a tailstock terminal configured at a tail portion of the vehicle;
   receiving, by the wireless terminal, handoff threshold parameters from the source cell base station, the handoff threshold parameters including a distance threshold and a signal strength threshold for a handover point for a target base station associated with a target cell, wherein the distance threshold is determined according to whether the wireless terminal is a headstock terminal or a tailstock terminal;
   determining a location of the handover point based on the handoff threshold parameters, wherein: a first distance between the handover point and the source cell base station is less than a second distance between the handover point and the target cell base station when the wireless terminal is a headstock terminal, and the first distance between the handover point and the source cell base station is greater than the second distance between the handover point and the target cell base station when the wireless terminal is a tailstock terminal; and
   when the wireless terminal reaches the handover point, making a measurement on a wireless channel of the wireless terminal, and switching the wireless channel of the wireless terminal to the target cell from the source cell.

2. The method of claim 1, wherein:
   the request for parameter acquisition further includes direction of travel information of the wireless terminal.

3. The method of claim 1, said determining the location handover point including:
   navigating to a next handover point based on distance information and signal strength information of handover point and the source cell base station.

4. The method of claim 3, wherein the location of the handover point meets following two conditions simultaneously:
   a distance between the wireless terminal and the source cell base station is more than the distance threshold in the handoff threshold parameter; and
   a signal strength is lower than the signal strength threshold in the handoff threshold parameter.

5. The method of claim 1, wherein at least two handover points are configured between the target cell base station and the source cell base station, the location of each handover point is configured where the wireless terminal receive signals from two neighbor base stations, intensities of the two signals being closest; and each base station is configured to maintain four handover points.

6. The method of claim 1, said making a measurement on the wireless channel, and switching the wireless channel to the target cell from the source cell, including:
   when the wireless terminal reaches the handover point, sending a channel measurement request to the source cell base station;
   receiving a channel measurement response from the source cell base station is sent;
   sending a channel measurement report to the source cell base station;
   sending a switching request to the source cell base station;
   receive a switching command from the source cell base station; and
   switching from the source cell to the target cell at the handover point.

7. The terminal of claim 1, wherein the processor is further configured to:
   navigate to a next handover point based on distance information and signal strength information of handover point and the source cell base station.

8. The terminal of claim 7, the location of the handover point meets following two conditions simultaneously:
   a distance between the wireless terminal and the source cell base station is more than the distance threshold in the handoff threshold parameter; and
   a signal strength is lower than the signal strength threshold in the handoff threshold parameter.

9. A wireless terminal used for a vehicle, comprising a processor configured to:
   send a request for parameter acquisition to a source cell base station associated with a source cell, the request including whether the wireless terminal is a headstock terminal configured at a head portion of the vehicle or a tailstock terminal configured at a tail portion of the vehicle;
   receive handoff threshold parameters from the source cell base station, the handoff threshold parameters including a distance threshold and a signal strength threshold for a handover point for a target base station associated with a target cell, wherein the distance threshold is determined according to whether the wireless terminal is a headstock terminal or a tailstock terminal;
   determine a location of the handover point based on the handoff threshold parameters, wherein: a first distance between the handover point and the source cell base station is less than a second distance between the handover point and the target cell base station when the wireless terminal is a headstock terminal, and the first distance between the handover point and the source cell base station is greater than the second distance between the handover point and the target cell base station when the wireless terminal is a tailstock terminal; and
   when the wireless terminal reaches the handover point, make a measurement on a wireless channel of the wireless terminal, and switch the wireless channel of the wireless terminal to the target cell from the source cell.

10. The wireless terminal of claim 9, wherein:
the request for parameter acquisition further includes direction of travel information of the wireless terminal.

11. The terminal of claim 9, wherein the processor is further configured to:
when the wireless terminal reaches the handover point, send a channel measurement request to the source cell base station;
receive a channel measurement response from the source cell base station; and
send a channel measurement report to the source cell base station.

12. The terminal of claim 11, wherein the processor is further configured to:
send a switching request to the source cell base station;
receive a switching command from the source cell base station; and
switch from the source cell to the target cell at the handover point.

\* \* \* \* \*